Figure 3:
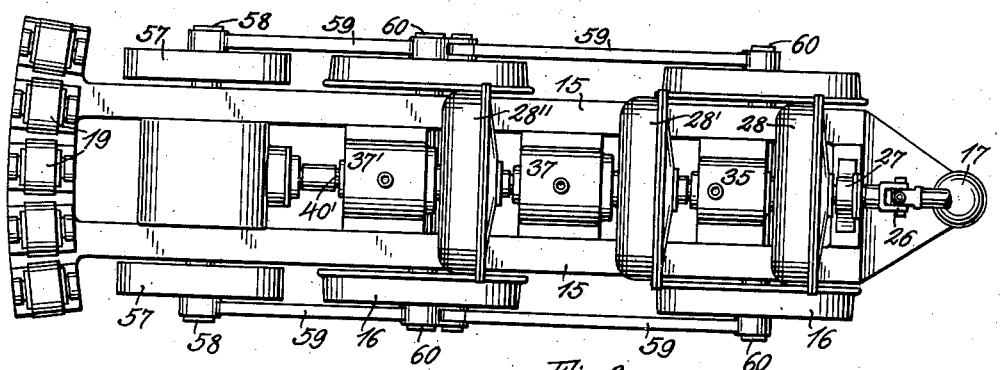

Sept. 19, 1939.  J. P. RUTH  2,173,729
POWER TRANSMISSION
Filed Feb. 10, 1936   2 Sheets-Sheet 1
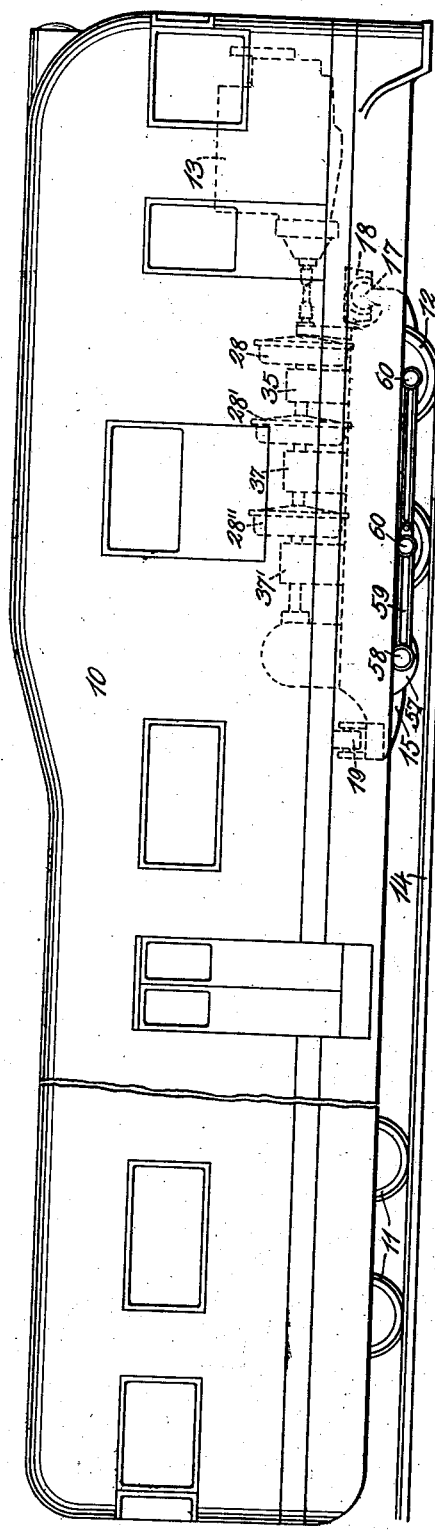
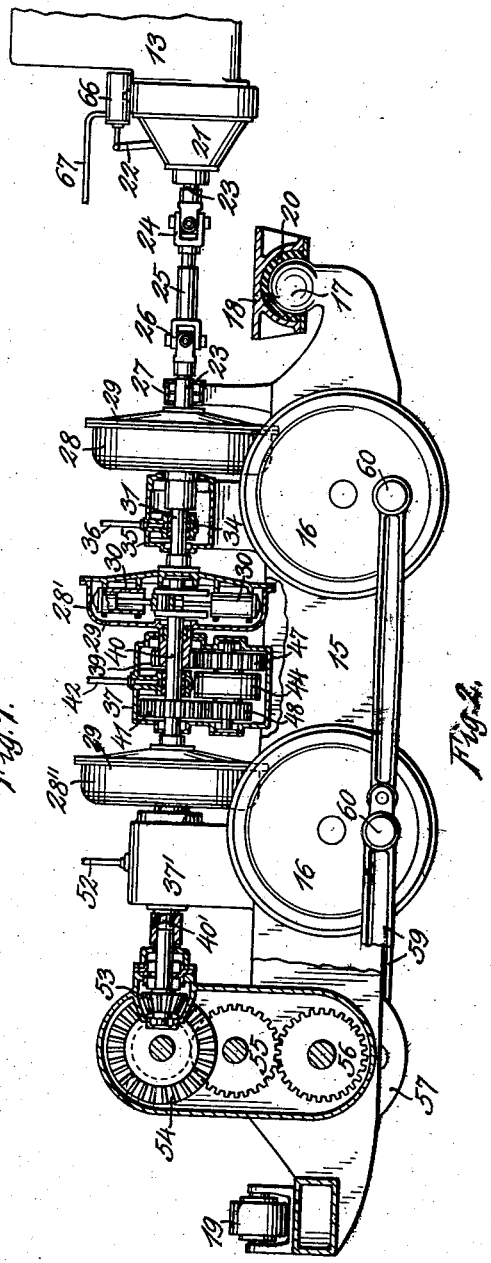
Inventor
Joseph P. Ruth.
By Homer J. Sweet
Attorney Sept. 19, 1939.  J. P. RUTH  2,173,729

POWER TRANSMISSION

Filed Feb. 10, 1936  2 Sheets-Sheet 2

Inventor
Joseph P. Ruth.
By Howell Sweet
Attorney

Patented Sept. 19, 1939

2,173,729

UNITED STATES PATENT OFFICE 2,173,729

POWER TRANSMISSION

Joseph P. Ruth, Denver, Colo.

Application February 10, 1936, Serial No. 63,077

4 Claims. (Cl. 105—96.2)

This invention relates to the transmission of power from a prime mover to effect useful work, and has as an object to provide an improved method and arrangement of means wherethrough such power may be made practically and conveniently effective.

A further object of the invention is to provide an improved method of power transmission wherein a uniform power factor may be automatically applied to practical work effect under variable load conditions.

A further object of the invention is to provide an improved method for the automatic transmission of uniform power to perform practically effective work under variable load conditions.

A further object of the invention is to provide an improved method of power transmission effective for the automatic selection of a practically operative speed ratio between a source of uniform power and a variable load.

A further object of the invention is to provide an improved arrangement and combination of elements wherethrough uniform power may be transmitted and automatically geared for practical work effect under variable load conditions.

A further object of the invention is to provide an improved arrangement and combination of elements comprising a unit power transmission assembly wherethrough uniform power may be selectively and automatically applied to practical work effect under and proportioned to variable load conditions.

A further object of the invention is to provide an improved power truck unit particularly adapted for operative association with a source of uniform power, such as a Diesel engine.

A further object of the invention is to provide an improved arrangement of means automatically and selectively operable to vary the speed ratio between a source of uniform power and a variable load.

A further object of the invention is to provide an improved power truck unit assembly particularly adapted for convenient removable and replaceable operative association with a Diesel-powered rail unit.

A further object of the invention is to provide an improved variable-speed power transmission assembly arranged for selective control through a fluid pressure system.

A further object of the invention is to provide improved means for operatively interconnecting a power truck unit with a rail car unit.

A further object of the invention is to provide an improved power transmission automatically operable to maintain the highest practical speed ratio between a source of uniform power and a variable load.

A further object of the invention is to provide improved fluid pressure control means for the selective engagement of the desired speed ratio in a variable-speed transmission.

My invention consists in the arrangement, construction and combination of elements hereinafter set forth, pointed out in my claims, and illustrated by the accompanying drawings, in which—

Figure 4:
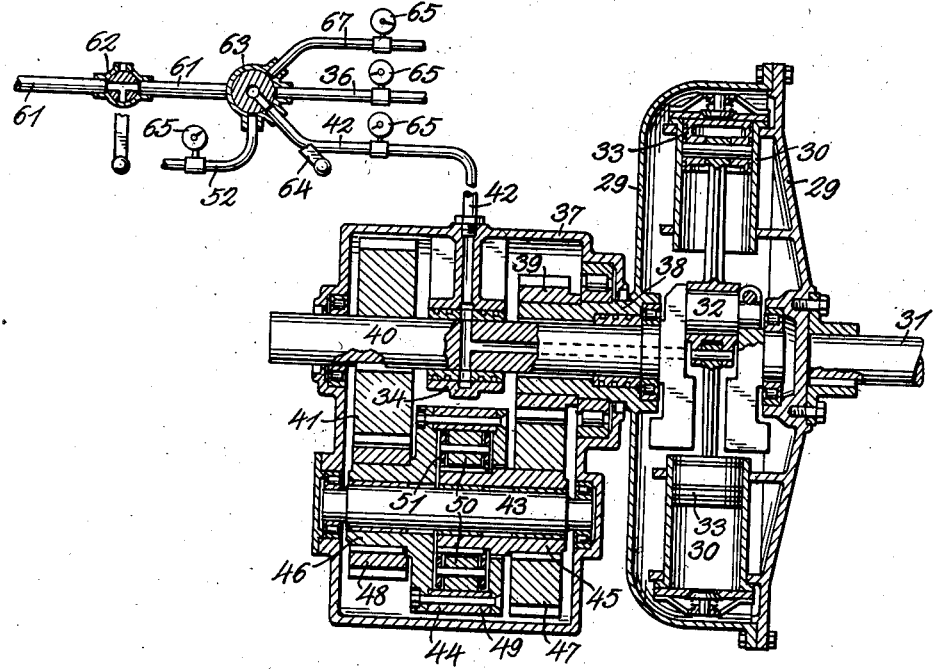
Figure 5:
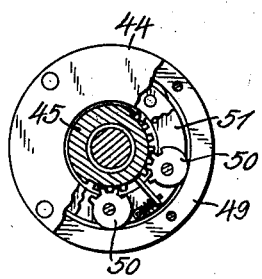

Figure 1 is a side elevation of one type of conventionalized rail unit wherewith the improvement is operatively associated, the position of the power unit and certain elements of the improvement being indicated by dotted lines and portions of the rail unit being broken away to conserve space. Figure 2 is a side elevation, partly in section and on an enlarged scale, of the power truck unit shown in Figure 1, the major portion of the conventional prime mover being omitted to conserve space. Figure 3 is a top plan view of the power truck unit shown in Figures 1 and 2. Figure 4 is a vertical section, on a further enlarged scale, axially through one of the speed reduction and associated fluid pressure clutch unit assemblies employed in the improved power transmission, portions of a conventionalized fluid pressure control system being indicated on a reduced scale in operative association with the other elements of the view. Figure 5 is an end elevation, partly in section, of a conventional automatic clutch advantageously employed with the other elements of the improvement.

In the construction of the improvement as shown, a self-contained, single car, rail unit is conventionally illustrated as comprising a car frame and body assembly 10, suitably supported on wheeled rear and front trucks, 11 and 12, respectively, for power propulsion deriving from a Diesel engine or equivalent prime mover 13 along a conventional railway 14. In the embodiment of the invention illustrated, the prime mover 13 is mounted in the forward end of the car body 10 and is arranged to transmit power to and for rotation of the wheels of the forward truck 12, though it is obvious that the invention may be employed with various specific arrangements of car unit, prime mover and power truck, as may be deemed expedient or desirable.

To facilitate construction and maintenance of rail units of the type shown, and to enhance their operative efficiency, the truck 12 wherethrough the power from the prime mover 13 is effectively applied is constructed to include the improved power transmission in a unit assembly arranged for convenient removal and replacement relative to the car 10 and for convenient operative connection with the prime mover 13. The power truck unit assembly 12 comprises a suitable rigid frame 15 operatively associated with and supported by rail wheel and axle units 16 in such number and specific arrangement as may be desired, said frame 15 preferably being formed with or fixedly supporting a ball pivot 17 rising from its forward end on the longitudinal median line of the truck assembly and adapted to be received in a suitable socket 18 carried in fixed, depending relation by the frame of the car unit 10, whereby the truck assembly may be conveniently connected in pivotal relation with and beneath the car unit. The rear end of the truck frame 15 is extended laterally to form a suitable base whereon a plurality of heavy-duty, antifriction roller assemblies 19 are disposed along the arc of a circle concentric with the ball pivot 17 with their axes horizontal to provide a rolling bearing between the rear end of the truck 12 and a frame portion of the car unit 10, the said truck 12 being thus operatively associated in supporting relation with the car unit 10 in a manner which permits of propulsion of the car unit through the tractive effect delivered through the wheel and axle assemblies 16 and which permits of angular adjustment of the truck 12 in a horizontal plane relative to the car unit 10 for accommodation of track curvature and irregularities. To minimize frictional wear, to reduce operative noise and to provide a desirable cushion, the socket 18 is preferably provided with a liner 20 of relatively yieldable material, such as rubber, suitable composition of matter, and the like, wherein the pivot ball 17 is received and seated.

The prime mover 13 is disposed with its power shaft in parallel alignment with the longitudinal median line of the truck 12 and is extended through a conventional clutch assembly 21 for operative connection with the power transmission elements of said truck. The clutch assembly 21 is provided with the usual actuating arm or lever 22 whereby the clutch may be selectively operated to connect or disconnect the power train with the source of power, as is common practice. Rearwardly of the clutch assembly 21, the power shaft 23 is provided with a suitable universal joint 24 positioned just forwardly of the pivotal axis of the truck 12, is continued through an axially-adjustable, splined, telescoping connection 25 to a second universal joint 26 positioned just rearwardly of the truck pivotal axis, and extends thence through a suitable journal bearing 27 rising from the forward portion of the truck 12 to a fixed connection with the casing of a fluid-pressure clutch assembly 28, which latter is thus mounted for rotation on the truck 12 in direct connection through the clutch 21 with the power shaft of the prime mover 13. Through the use of the two universal joints 24 and 26 positioned in spaced relation on opposite sides of the truck pivotal axis and operatively interconnected by means of the telescoping joint 25, sufficient flexibility is provided between the prime mover 13 and power transmission carried by the truck 12 to permit said truck to pivot as may be required without binding of the power shaft and without interruption of the power flow therethrough, said connections further providing convenient means available for the connection or disconnection of a given prime mover with a given power truck unit whenever removal or replacement of the latter is indicated.

The fluid-pressure clutch assembly 28 may take any one of various specific forms suitable to the purpose and function hereinafter described, but is specifically illustrated as comprising the construction shown and described in my copending application for United States patent, Serial Number, 737,245, entitled Torque transmitters. As shown, the clutch assembly 28 comprises a closed, hollow, cylindrical casing 29 fixed to and for rotation with a power shaft 23 and provided with a plurality of radially-disposed cylinders 30 fixed interiorly thereof. A driven shaft element 31 is rotatably received on that side of the casing 29 opposite to and in axial alignment with the shaft 23 and is provided with a crank pin 32 disposed within said casing, and suitable pistons 33 are operatively carried by said crank pin 32 for reciprocation in and radially of the casing 29. The cylinders 30 are provided with valves and ports so arranged as to permit of free reciprocation of the pistons 33 relative to their cylinders 30 when atmospheric pressure only is present within the casing 29, at which time the shafts 23 and 31 may be rotated freely at different angular velocities with only that resistance resulting from the free reciprocation of the pistons within their cylinders, the valves and ports of the cylinders 30 being so arranged as to impose a resistance to the free reciprocation of the pistons within their cylinders as the pressure within the casing 29 is increased, a maximum pressure serving to substantially lock each piston 33 against travel relative to its cylinder 30 for simultaneous, synchronized rotation of the shafts 23 and 31, all of which is fully shown and described in my copending application above noted. To provide means for controlling the pressure of fluid within the clutch assembly 28, the shaft 31 is provided with an axial bore communicating at one end within the casing 29 and at its other end with a transverse bore in end registration with an annular chamber formed in a gland 34 sealed about said shaft 31 and fixedly supported within a housing 35 carried by the truck frame 15, which gland chamber is maintained in operative communication with a fluid pressure system through a pipe or conduit 36.

The outer or rearward end of the shaft 31 is in turn fixed to and concentrically of a second fluid-pressure clutch assembly 28' which is in all essential functional respects identical with the assembly previously described. The second clutch assembly 28' is disposed for rotation closely adjacent a gear box 37 fixed to the truck frame 15, and its casing 29 is provided with a hub portion 38 projecting in relatively fixed, axial relation from that side of the casing opposite to the shaft 31 through a journal bearing in the adjacent wall of the gear box 37, whereby said clutch assembly is supported and rotatably mounted. Within the gear box 37 the inner end of the hub 38 supports and is fixed to a suitable gear or pinion 39, which latter is thus mounted to rotate within the gear box simultaneously and synchronously with the shaft 31 and casing 29 of the second clutch assembly. The driven shaft of the second clutch assembly 28' is indicated at 40 and is shown as extending axially from said second clutch assembly through the hub 38 of the latter and through a journal bearing in the opposite wall of the gear box 37 to fixed connection with the casing 29 of a third fluid-pressure clutch assembly 28″. The shaft 40 is rotatably secured to and supports a suitable gear or pinion 41 of larger size than the gear 39 and positioned within the gear box 37 in axially spaced relation with said gear 39, said shaft 40 being sealed through a chambered gland 34 positioned between the gears 39 and 41 in fixed relation with the gear case 37 and with its chamber in communication through a pipe or conduit 42 with a fluid pressure system, the shaft 40 being provided with a transverse bore in end communication with the gland chamber and an axial bore communicating between said transverse bore and the interior of the second clutch assembly 28′. A countershaft 43 is mounted in the gear box 37 beneath and in spaced, parallel relation with the shaft 40 and rotatably supports an over-running clutch assembly 44 positioned thereon beneath the gland 34. The over-running clutch assembly 44 is provided with separately rotatable, axially-aligned, oppositely-directed hub portions 45 and 46 whereto are secured, respectively, a larger gear or pinion 47 meshing with the gear 39 and a smaller gear or pinion 48 meshing with the gear 41, and said clutch assembly 44 is arranged so as to automatically engage its hub portions 45 and 46 for simultaneous synchronous rotation when the angular velocity of the gear 47 deriving from the gear 39 and shaft 31 is greater than the angular velocity of the gear 48 deriving from the gear 41 and shaft 40, and to disengage the hub portions 45 and 46 for independent rotation when the angular velocity of the gear 47 becomes less than that of the gear 48. The over-running clutch assembly 44 is susceptible of practical embodiment in a variety of specific constructions, one such construction satisfactory to the purpose set forth being illustrated as comprising a cylindrical ring 49 in fixed relation with the hub 46 and defining an annular chamber about the inner end of the hub 45, a spur gear formed on the inner end of said hub 45 within said chamber, a plurality of cam rollers 50 each eccentrically rotatable relative to and supported by a cage 51 loosely mounted within the annular chamber, and gear teeth on each of the cam rollers 50 in meshing engagement with the gear on the inner end of the hub 45, which arrangement provides that angular velocity of the hub 45 exceeding the angular velocity of the hub 46 will act through the gear of said hub 45 and the teeth of the cam rollers 50 to rotate the latter into engagement of their cam surfaces against the inner wall of the annular chamber defined by the ring 49 for consequent clutched engagement of the hubs 45 and 46, it being obvious that angular velocity of the hub 46 greater than that of the hub 45 will act to disengage the cam surfaces of the rollers 50 from the ring 49 and permit free, independent rotation of the hubs 45 and 46.

With the gear train arrangement shown and above described, it is apparent that when the pressure within the clutch assembly 28′ is such as to permit free reciprocation of the pistons 33 relative to their cylinders 30 the rotation of the clutch casing 29 deriving from the shaft 31 acts through the gears 39 and 47, over-running clutch assembly 44, and gears 48 and 41 to rotatably drive the shaft 40 in the same direction as and at a less speed determined by the gear ratios than the angular velocity of the shaft 31. However, when the pressure within the clutch assembly 28′ is increased to limit reciprocation of the pistons 33 relative to their cylinders 30, the clutch assembly 28′ tends to rotate as a unit for rotation of the shaft 40 at a speed the same as that of the shaft 31, which increase in the speed of the shaft 40 produces through the gears 41 and 48 an over-running effect of the ring 49 relative to the cam rollers 50 and hub 45, the latter being relatively retarded by the meshed gears 47 and 39, and the clutch assembly 44 is consequently disengaged to permit free, independent rotation of its hub portions 45 and 46 with consequent direct driving of the shaft 40 by the shaft 31 and idling of the meshed gears 39, 47 and 41, 48. Should the pressure within the clutch assembly 28′ be maintained in an amount sufficient to permit travel of the pistons 33 within their cylinders 30 before the load factor of the shaft 40 equals the torque delivered by the shaft 31, then any increase in the load factor of the shaft 40, imposed during direct driven relation of said latter shaft with the shaft 31, will result in travel of the pistons 33 relative to their cylinders 30 and consequent reduction in the driven speed of the shaft 40. When the reduction in the driven speed of the shaft 40 is sufficient to actuate the clutch assembly 44 for clutched engagement of its hubs 45 and 46 the power from the shaft 31 is transmitted through the gear train to positively drive the shaft 40 at a reduced speed but with such application of power as will compensate for the increased load, any reduction of the load on the shaft 40 automatically permitting the pressure in the clutch assembly 28′ to again limit travel of the pistons 33 for direct drive of the shaft 40 by the shaft 31 when the former is speeded up for release of the clutch assembly 44. Thus the shaft 31 is in constantly driving relation with the shaft 40 and the pressure within the clutch assembly 28′ is the factor controlling the speed ratio between said shafts, a minimum pressure serving to drive the shaft 40 through the gear train at its lowest speed relative to that of the shaft 31, a maximum pressure serving to positively position the clutch elements for direct drive relation between said shafts, and an intermediate pressure serving to permit automatic variation in the speed ratios of said shafts between the upper and lower limits just recited in accordance with variations of the load factor effecting the shaft 40, so long as such load factor does not exceed the torque delivered by the shaft 31 through the gear train.

The pressure clutch and gear box assembly just described provides a selective, automatic, or selectively automatic two-speed power transmission unit which in itself may be adequate for the requirements of a given installation, in which case the shaft 40 may be directly connected in any suitable specific manner with the apparatus or elements to be actuated. However, when the transmission is applied to overcome the load variations encountered in starting and operating a rail vehicle it is expedient to provide for additional speed ratios, which can readily be done through the operative association of additional pressure clutch and gear box unit assemblies with the one just described. As shown in Figures 1, 2 and 3, the shaft 40 is fixed to and for rotation of the casing 29 of a third pressure clutch assembly 28″, which latter is operatively associated with a gear box 37′ in all respects identical with the gear box 37 and its contents to drive, in the manner previously set forth, a shaft element 40′ corresponding with the shaft 40, pressure being supplied to the clutch assembly 28″ through a pipe or conduit 52 corresponding with the element 42 of the gear box 37. This arrangement provides a two-speed ratio between the shafts 40 and 40', and a two-speed ratio between the shafts 31 and 40 wherein, through proper control of the pressures within the clutch assemblies 28' and 28", any one of the four possible speed ratios may be employed, either selectively or automatically, to apply power from the prime mover 13 to effect rotation of the shaft 40'. In the power truck assembly illustrated, the power from the prime mover 13 transmitted through the shaft 40' is delivered to effect rotation of the wheel and axle assemblies 16 through a bevel pinion 53 fixed to the shaft 40' in meshing engagement with a bevel gear 54 which in turn drives the gears 55 and 56 for rotation of crank plates 57 carried on opposite sides of the truck frame 15 in suitable alignment with the wheels of the assemblies 16, the crank pins 58 of the crank plates 57 being suitably connected by means of conventional driving links 59 with the crank pins 60 of the wheels 16.

The selective control system for the power transmission unit assembly shown and above described comprises a fluid pressure distributing and control system wherethrough fluid pressure may be selectively supplied to and maintained in the clutch assemblies 28, 28' and 28", and may conveniently include fluid pressure control of means for actuating the mechanical clutch assembly 21 of the prime mover 13. The selective control system may be practically embodied in any one of a variety of specific constructions and arrangements suitable to the purpose set forth, one practical arrangement of such a control system being diagrammatically illustrated in association with the showing of Figure 4. As shown, a pressure line 61 communicates through a suitable, manually-operable, two-way valve 62 between a suitable source or reservoir of fluid pressure, as shown, and a manually-operable control valve 63 to supply fluid pressure to the rotor element of the latter valve. The valve 62 is arranged to connect the valve 63 with the supply of fluid pressure when in one position and to connect the valve 63 for exhaust or discharge of fluid pressure when in its alternative position. The fluid pressure lines or conduits 36, 42 and 52, respectively serving the clutch assemblies 28, 28' and 28", are operatively connected with the valve 63 in spaced, independent relation, and the rotor element of said valve is arranged to be selectively positioned, through the agency of a suitable lever 64, to operatively interconnect the fluid pressure supply line 61 with any one of the lines or conduits 36, 42 and 52, suitable pressure gauge 65 preferably being operatively associated with each of the lines or conduits 36, 42 and 52 to record the pressure obtaining in each of said lines or conduits and the pressure consequently obtaining in the clutch assemblies served thereby. It will be apparent that with the valve 62 positioned for supply of fluid pressure to the valve 63, manual positioning of the valve 63 in communicating relation with one of the lines or conduits 36, 42 and 52 will result in delivery of fluid under pressure to the clutch assembly served by such line, and that with the valve 62 in its alternative position, the supply of fluid pressure is interrupted and such positioning of the valve 63 will permit of reduction in their exhaust of fluid pressure above atmospheric pressure from the clutch assembly served by the line or conduit then communicating through the valve 63. To conveniently combine the control of all of the clutch elements of the improved transmission in a single system, a fluid pressure cylinder and piston combination 66 may be associated with the mechanical clutch assembly 21 and operatively connected with the clutch arm 22 for actuation of the clutch assembly between its engaged and disengaged positions, a pressure line or conduit 67, equipped with a suitable gauge 65, communicating between the cylinder 66 and the valve 63 for operative association with the latter for selective communication therethrough with the supply line 61 in the manner previously described. The arrangement of control system shown is particularly advantageous in that it permits of progressive engagement or release of the clutch elements employed in the improved transmission through a single control element and further provides for convenient regulation of the clutch engaging pressures for progressive automatic release of said clutches in proportion with increases in the load factors imposed thereon. It is to be noted that automatic pressure relief valves may be operatively included in each of the pressure lines or conduits 36, 42 and 52 and adjusted for the maintenance of maximum pressures such as will permit disengagement of the clutch assemblies served thereby before the load factor imposed on said clutch assemblies reaches the torque capacity or output of the prime mover 13, such adjustment preferably providing for maximum pressures proportioned to progressively disengage the clutch assemblies 28", 28' and 28 in the order recited.

The improved power transmission is particularly adapted for association with a prime mover 13 arranged for uniform power output at uniform operating speed and when associated with a control system such as is shown and above described, the clutch assemblies 21, 28, 28' and 28" are arranged to idle in disengaged relation when normal atmospheric pressures only are present in the cylinder 66 and clutch casing 29. When it is desired to actuate the elements served by the power transmission, the valve 62 is set to supply fluid pressure to the valve 63 and the lever 64 is then moved to deliver pressure to the cylinder 66 and thereby effect operative engagement of the clutch assembly 21 to rotatably drive the casing 29 of the clutch assembly 28. The lever 64 is then moved to supply fluid pressure to the clutch assembly 28, engaging the latter to drive the casing 29 of the clutch assembly 28' which acts through the gear train of the box 37 to drive the casing 29 of the clutch assembly 28", which in turn acts through the gear train of the box 37' to drive the shaft 40' and actuate the wheel and axle assemblies 16 through the lowest or first gear ratio of the transmission, it being noted that pressure engagement of the clutch assembly 28, alone, is all that is required after engagement of the clutch assembly 21 to effect initial actuation of the elements driven by the transmission. The maximum pressure supplied to the clutch assembly 28 should be such as will permit of travel of the pistons 33 relative to the cylinders 30 of said clutch assembly and consequent yielding of the clutched engagement between the shafts 23 and 31 before the torque capacity of the prime mover is equaled by the load factor imposed on the shaft 31 through the gear trains, thus assuring that the prime mover will not stall and providing for a still further reduced gear ratio attained through slippage in the clutch assembly 28. With the load started, the control lever 64 is moved to supply fluid pressure to the clutch assembly 28' until such clutch assembly is engaged to drive the shaft 40 with the same speed as the shaft 31, thus releasing the overrunning clutch 44 of the box 37 to permit direct driving of the casing 29 of the clutch assembly 28'' by the prime mover, said drive acting through the gear train of the box 37' to actuate the wheel and axle assembly 16 at a relatively higher speed, the maximum pressure supplied to the clutch assembly 28'' preferably being somewhat less than that supplied to the clutch assembly 28 so that the clutch assembly 28' will yield to permit an ultimate drive at the lowest gear before yielding of the clutched relation of the assembly 28.

In like manner, the lever 64 is subsequently moved to supply fluid pressure to the clutch assembly 28'' for engagement of the latter to provide a direct drive between the prime mover 13 and power take-off shaft 40', the maximum pressure supplied to the clutch assembly 28'' preferably being somewhat less than that supplied to the clutch assembly 28' to permit yielding of the former under increased load before the latter is caused to yield. The desired gear reduction may be selectively obtained at any time by manipulation of the valves 62 and 63 to reduce the pressure within either of the clutch assemblies 28' and 28'', and complete declutching of the prime mover may be had through reduction in the pressure supplies to the clutch assembly 28, but it is to be noted that when the pressures supplied to the clutch assemblies 28' and 28'' have once been adjusted to the desired relation, selection of a gear ratio proportioned to the ultimate load factor is automatically accomplished through yielding of the pressure clutch assemblies and that the entire selective control of the unit may be had through clutching and declutching of the prime mover accomplished through the assembly 28.

While a certain specific type of fluid pressure clutch has been shown and described, it is to be understood that other types of fluid pressure or mechanical clutches may be readily substituted for the construction shown without in any way departing from the spirit of the invention, and that such other types of clutches may be arranged for automatic, progressive disengagement to bring the gear trains into actuation and for either mechanical or fluid pressure control. The fluid pressure clutch construction shown is particularly adapted for use with the invention since such construction provides for gradual engagement of the clutch without jerk or sudden imposition of load and further permits operation of the clutch in yielding or partially engaged relation without damage to the assembly and with a consequent infinite progression between the positive speed ratios.

Since the improved power transmission above described is susceptible of practical operative association with a wide variety of prime movers and to effect actuation of various combinations of apparatus and driven elements, and may be given practical form in an infinite variety of specific constructions, arrangements and combinations, I wish to be understood as being limited solely by the appended claims, rather than by any details of the illustrative showing and foregoing description.

I claim as my invention—

1. A powered transport unit comprising a car body, a prime mover carried by said car body, a wheeled truck unit in pivotal supporting relation with said car body adjacent said prime mover, said truck unit including a rigid frame in transversely-pivotal, altitudinally-fixed relation with said car body and wheel elements rotatable in said frame, a variable-speed power transmission fixed to said truck frame with its power input and output axes aligned in the same horizontal plane with the power axis of said prime mover, a universally-adjustable driving connection operatively disposed between the power axis of said prime mover and the power input axis of said transmission and centered for angular adjustment in vertical alignment above the pivotal axis of said truck unit, and link-type driving connections between the output end of said power transmission and the wheel elements of said truck unit.

2. A powered transport unit comprising a car body, a prime mover carried by and with its power axis aligned longitudinally of said car body, a truck frame pivotally engaging at one end in supporting relation with said car body adjacent said prime mover and disposed for roller-supporting engagement of its other end in transversely-variable relation with said car body, whereby said frame is mounted in transversely-pivotal, altitudinally-fixed relation with said car body, wheel elements rotatably carried in said truck frame, a variable-speed power transmission carried by said truck frame with its power input and output axes aligned in the same horizontal plane with the power axis of said prime mover, universally-adjustable driving connections between the power axis of said prime mover and the input axis of said transmission and operatively centered for angular adjustment above and in vertical alignment with the pivotal axis of said truck frame, and link-type driving connections between the output end of said power transmission and said wheel elements.

3. In a powered transport unit having a car body, a prime mover carried by said car body with its power axis in longitudinal alignment with said body, and a wheeled truck in pivotal supporting relation with said car body adjacent said prime mover, means for operatively connecting said prime mover in driving relation with said truck wheels with a minimum of angular variation in the power line, said means comprising pivotal supporting engagement between the car body and the end of the truck frame adjacent said prime mover and roller supporting engagement between said car body and the other end of said truck frame, whereby said frame is mounted in transversely-pivotal altitudinally-fixed relation with said car body, a variable speed power transmission carried by said frame with its power input and output axes aligned in the same transverse plane as the power axis of said prime mover, angularly-adjustable driving connections engaging between the power axis of said prime mover and the input axis of said transmission and centered for angular adjustment on the pivotal axis of said truck frame, and link-type driving connections operatively engaging between the output end of said power transmission and the wheel elements of said truck.

4. In a powered transport unit having a car body, a prime mover carried by said car body with its power axis in longitudinal alignment with said body, and a wheeled truck in pivotal supporting relation with said car body adjacent said prime mover, means for operatively connecting said prime mover in driving relation with said truck wheels with a minimum of angular variation in the power line, said means comprising pivotal supporting engagement between the car body and the end of the truck frame adjacent said prime mover and roller supporting engagement between said car body and the other end of said truck frame, whereby said frame is mounted in transversely-pivotal altitudinally-fixed relation with said car body, a variable speed power transmission carried by said frame with its power input and output axes aligned in the same transverse plane as the power axis of said prime mover, angularly-adjustable driving connections engaging between the power axis of said prime mover and the input axis of said transmission and centered for angular adjustment on the pivotal axis of said truck frame, and driving connections including a transverse crank shaft and associated longitudinal links operatively disposed between the altitudinally-fixed output end of said power transmission and said truck wheels.

JOSEPH P. RUTH.